United States Patent [19]
Lee

[11] Patent Number: 6,042,094
[45] Date of Patent: Mar. 28, 2000

[54] SELF-CENTERING COLUMN ASSEMBLY EMPLOYING LIQUID SPRING AND STRUCTURES CONTAINING SUCH COLUMNS

[75] Inventor: David A. Lee, Santa Monica, Calif.

[73] Assignee: Tayco Developments, Inc., North Tonawanda, N.Y.

[21] Appl. No.: 08/887,433

[22] Filed: Jul. 2, 1997

Related U.S. Application Data

[63] Continuation-in-part of application No. 08/531,036, Sep. 20, 1995, Pat. No. 4,890,705.

[51] Int. Cl.[7] ............................................. F16F 1/00
[52] U.S. Cl. .................................. 267/150; 267/64.13
[58] Field of Search ........................ 267/64.11, 64.13, 267/64.26; 188/321.11; 213/19, 20, 21, 43; 52/646, 648.1, 655.9, 655.2, 167.6, 167.8

[56] References Cited

U.S. PATENT DOCUMENTS

| | | | |
|---|---|---|---|
| 2,469,118 | 5/1949 | Kinne et al. | 213/19 |
| 3,011,656 | 12/1961 | Metzger | 213/19 |
| 3,438,512 | 4/1969 | Metzger et al. | 213/19 |
| 3,556,313 | 1/1971 | Albanese | 213/20 |
| 3,561,612 | 2/1971 | LaBoda | 213/20 |
| 3,722,640 | 3/1973 | Taylor | 188/316 |
| 3,794,277 | 2/1974 | Smedley et al. | 52/167.8 |
| 3,907,122 | 9/1975 | Ksienysk et al. | 213/14 |
| 3,933,344 | 1/1976 | Taylor | 267/64 A |
| 4,029,304 | 6/1977 | Sakaguchi et al. | 267/64.15 |
| 4,277,045 | 7/1981 | Bargeron et al. | 248/599 |
| 4,312,429 | 1/1982 | Masclet | 188/315 |
| 4,582,303 | 4/1986 | Taylor | 267/64.13 |
| 4,611,794 | 9/1986 | Taylor | 267/64.13 |
| 4,630,805 | 12/1986 | Taylor | 267/64.13 |
| 4,892,051 | 1/1990 | Taylor et al. | 114/1 |
| 5,439,310 | 8/1995 | Evenson | 403/321 |

*Primary Examiner*—Chris Schwartz
*Assistant Examiner*—C. T. Bartz
*Attorney, Agent, or Firm*—Joseph P. Gastel

[57] ABSTRACT

A self-centering spring assembly which is a column located between first and second vertically spaced frame members including a first end on the column movably secured to the first frame member, a second end on the column secured to the second frame member, a member having a first end movably mounted on the column and a second end in movable engagement with the first frame member, and a liquid spring connected between the second end of the movable member and the column.

31 Claims, 13 Drawing Sheets

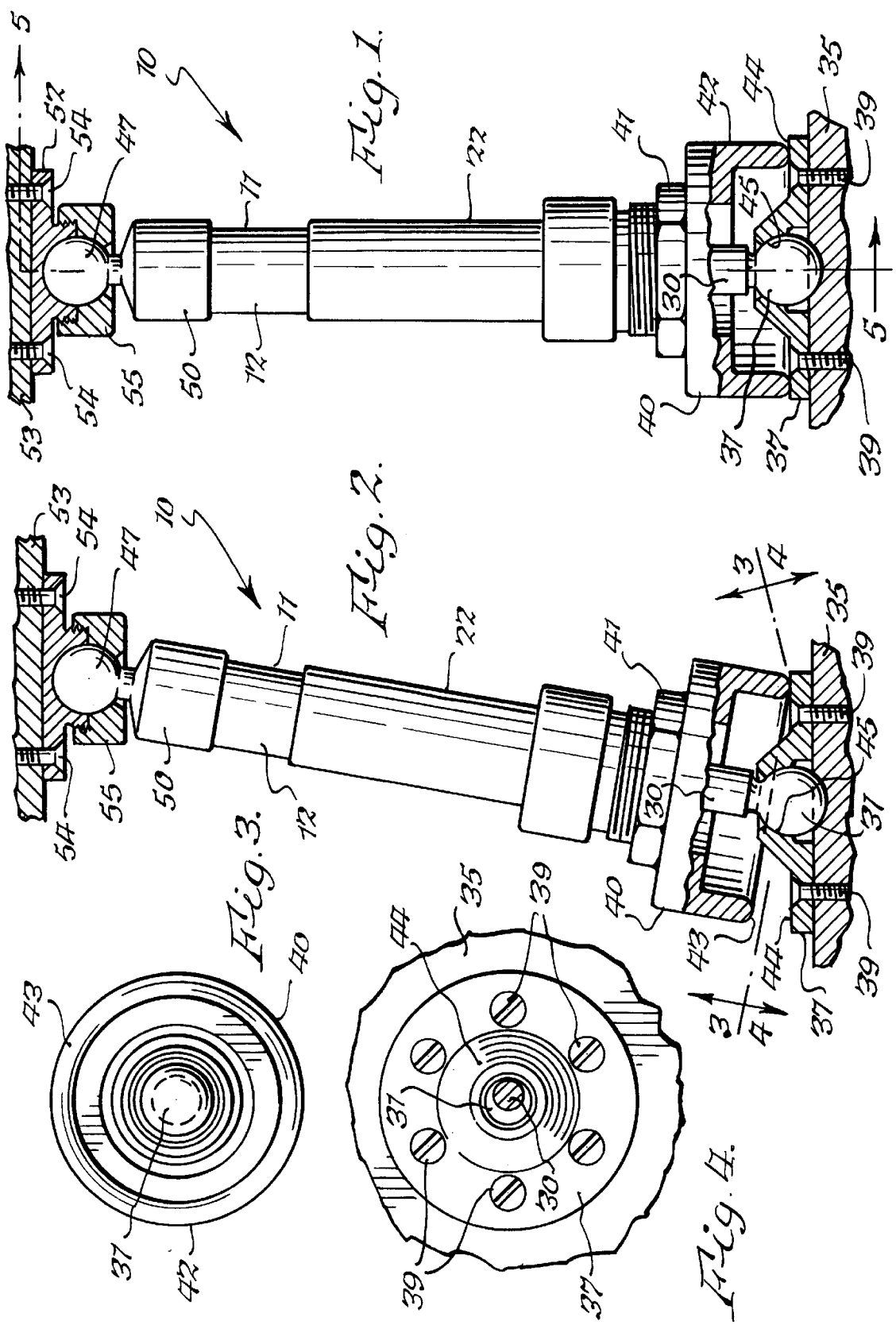

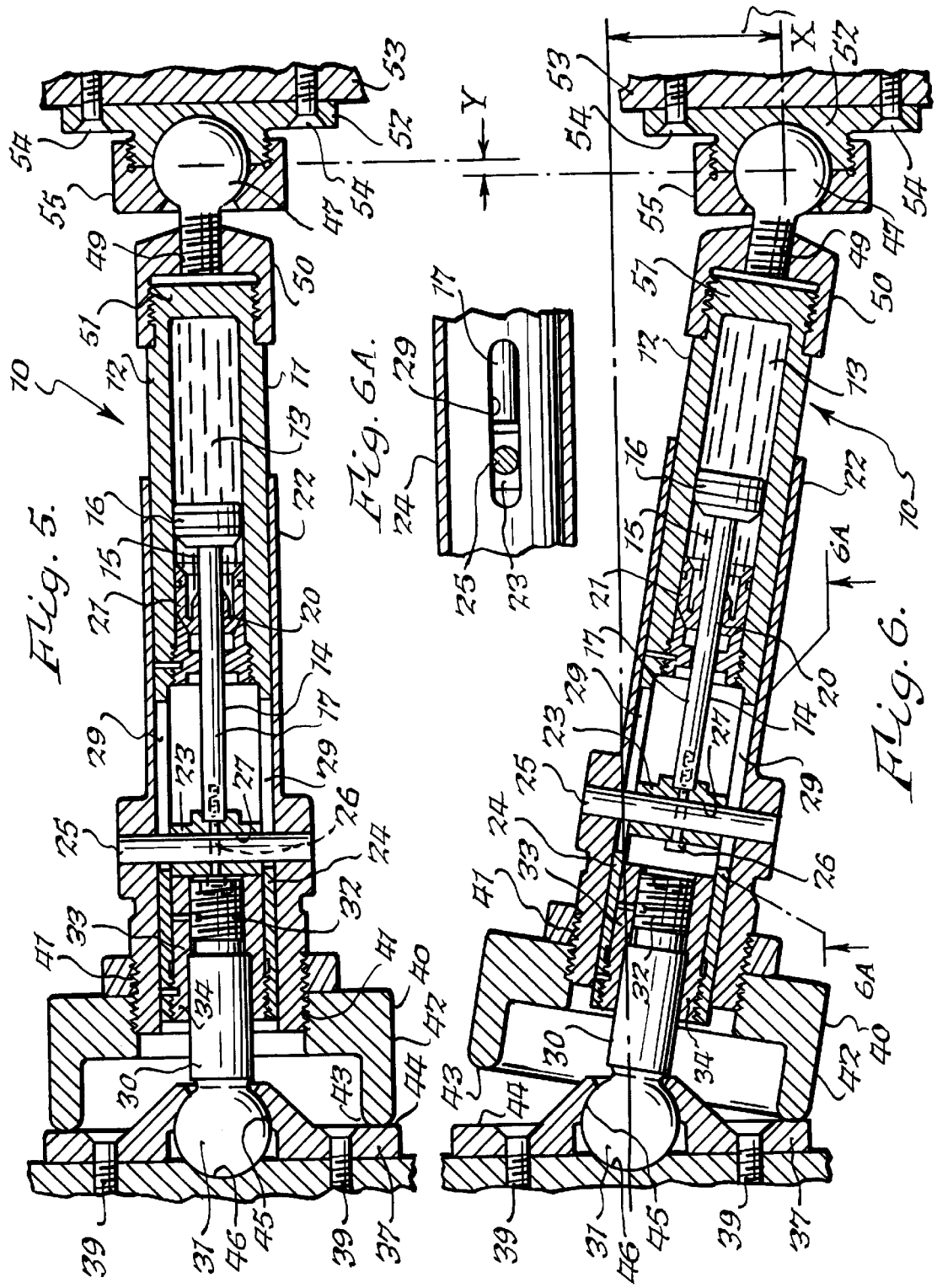

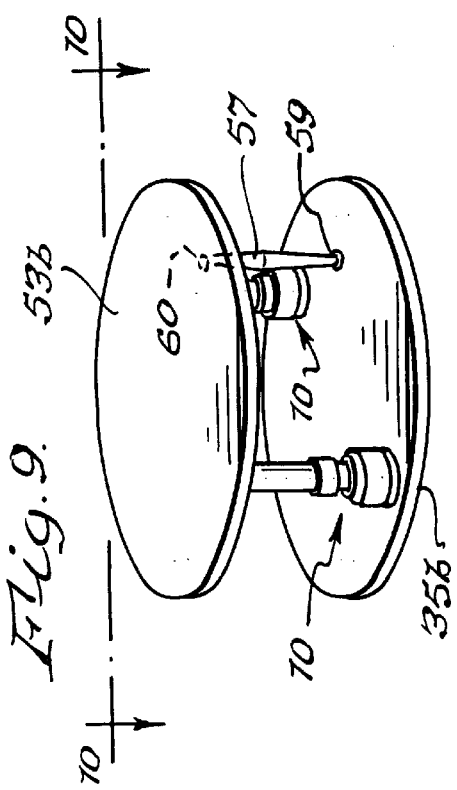
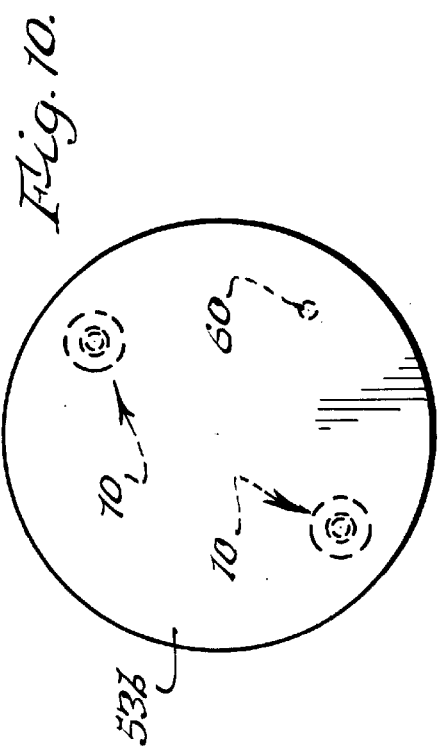
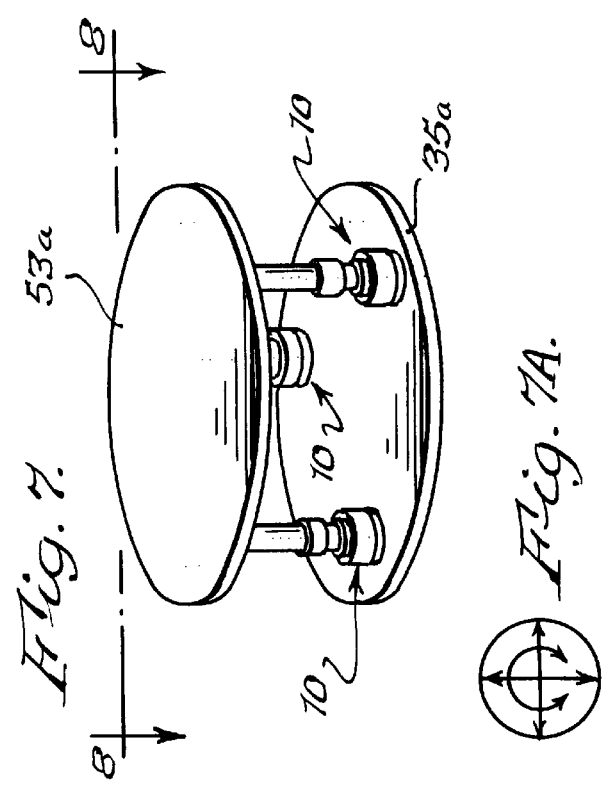
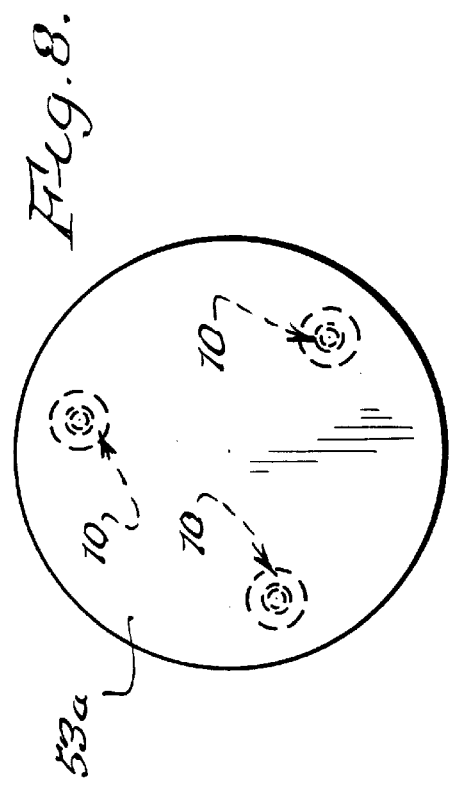

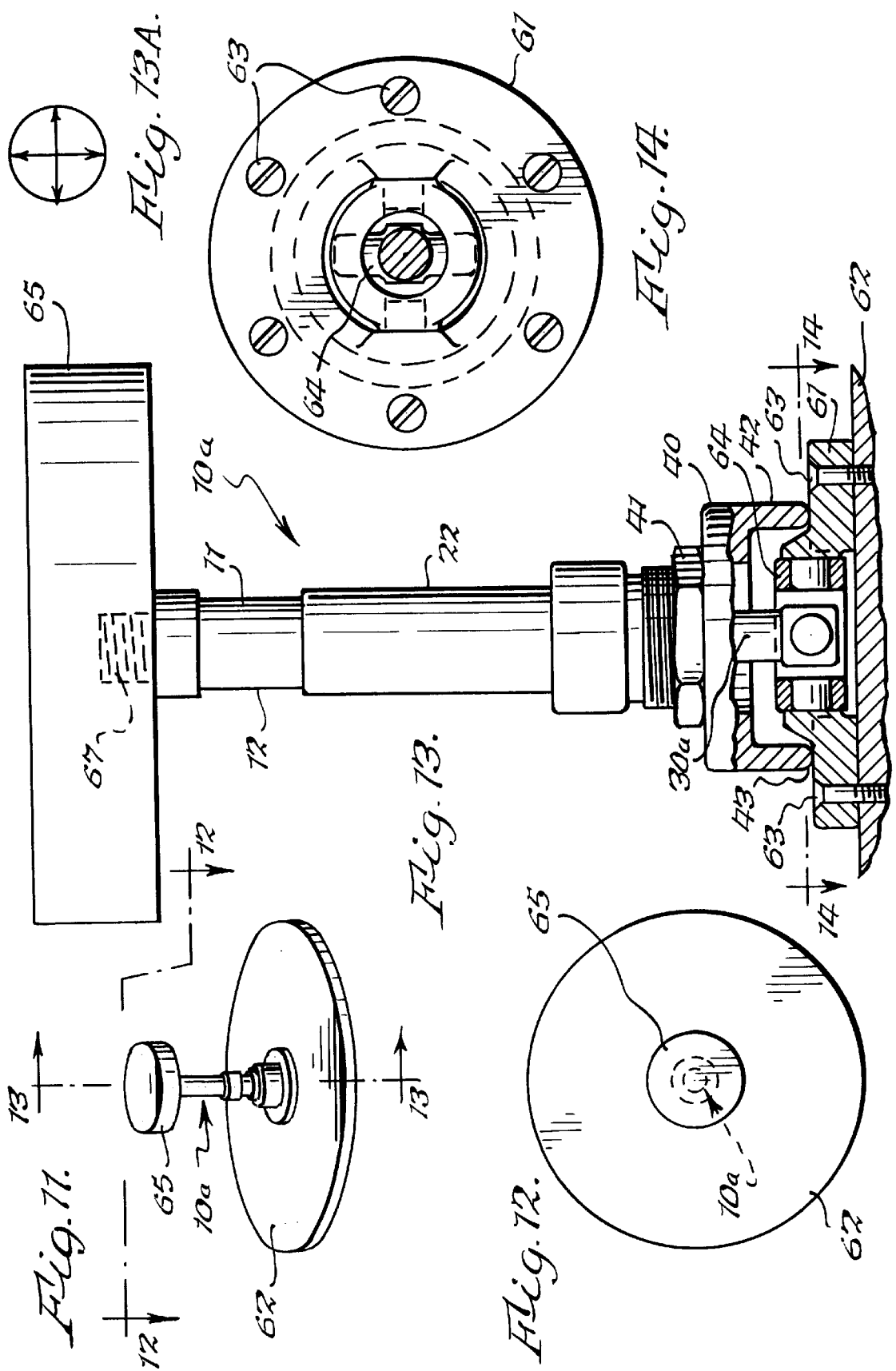

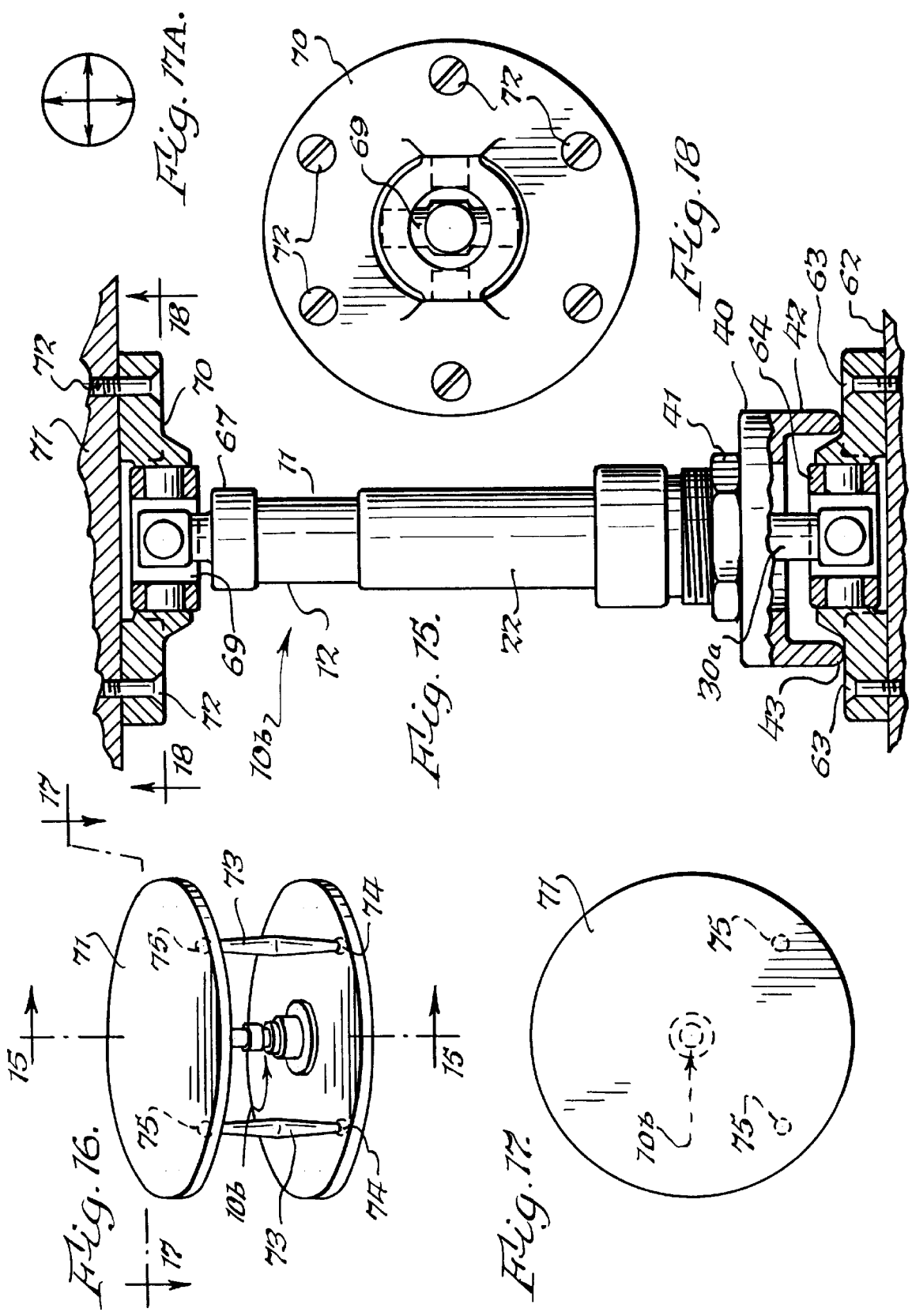

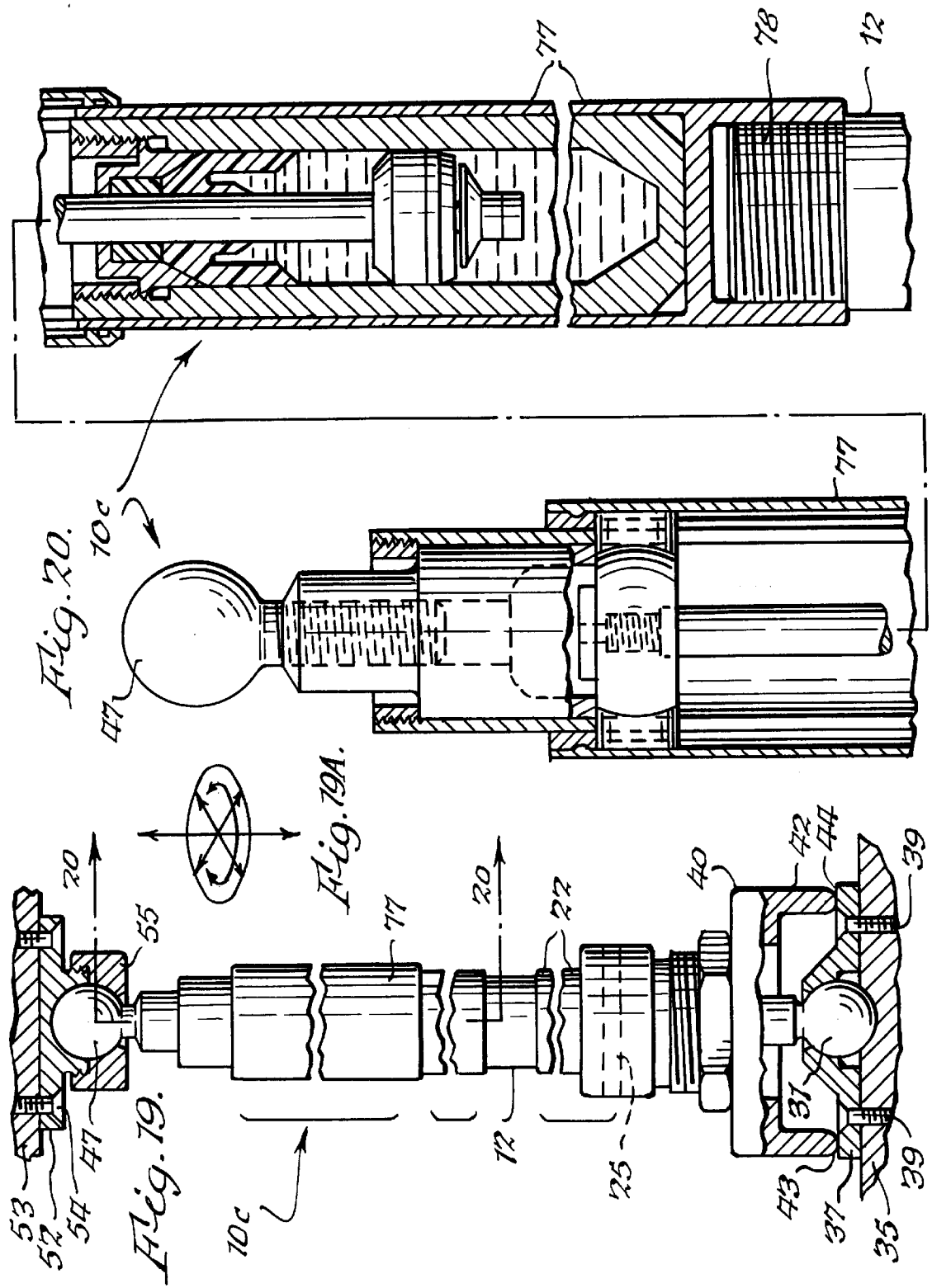

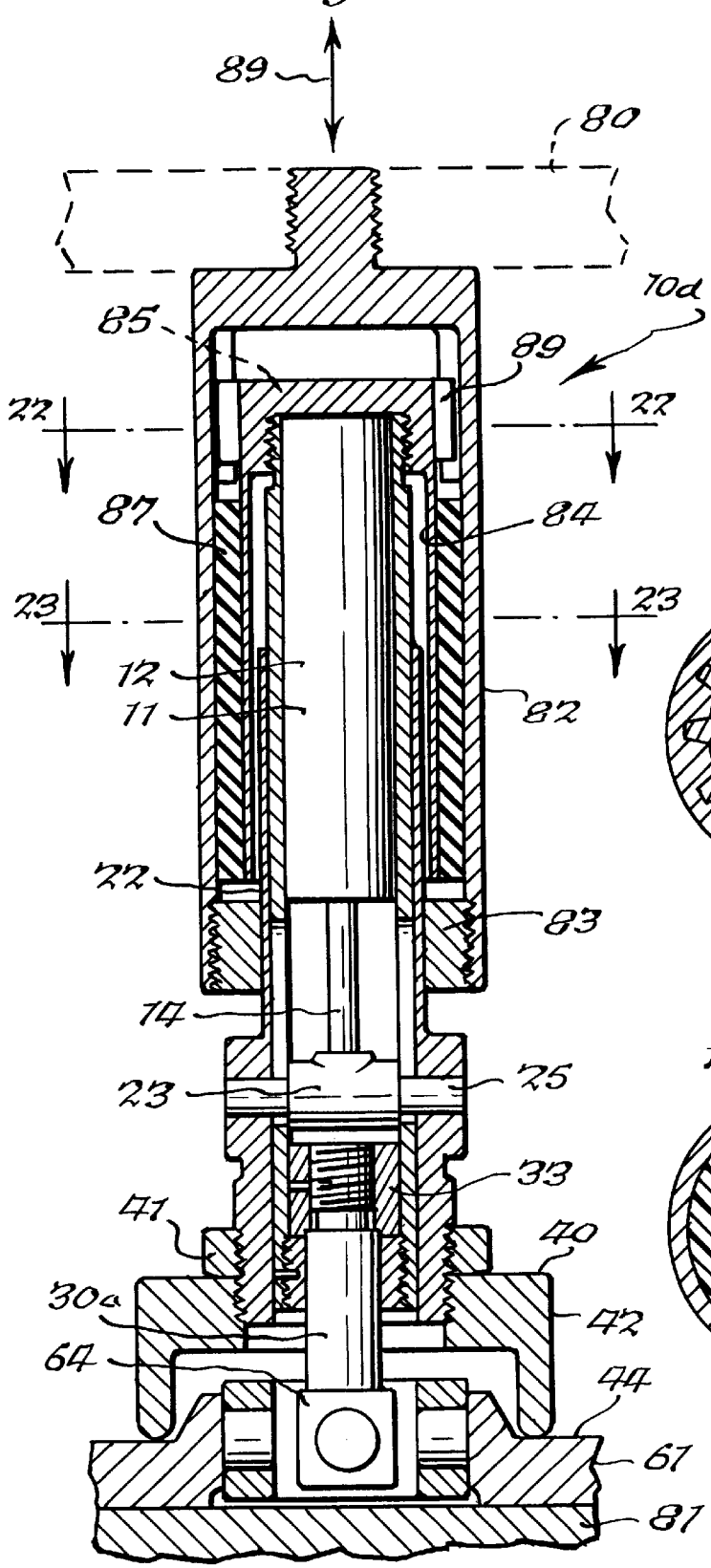
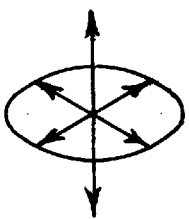
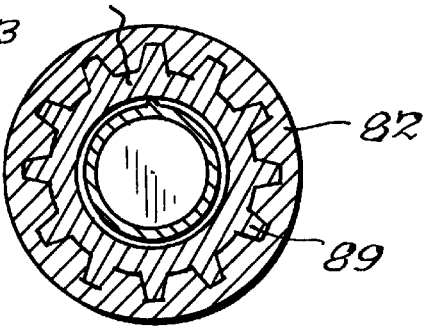
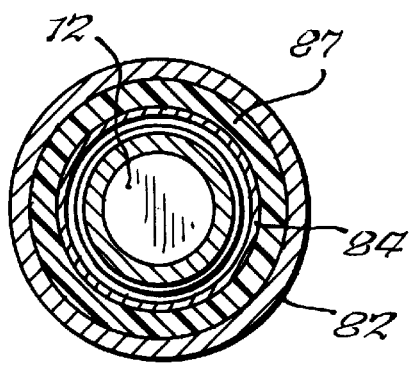

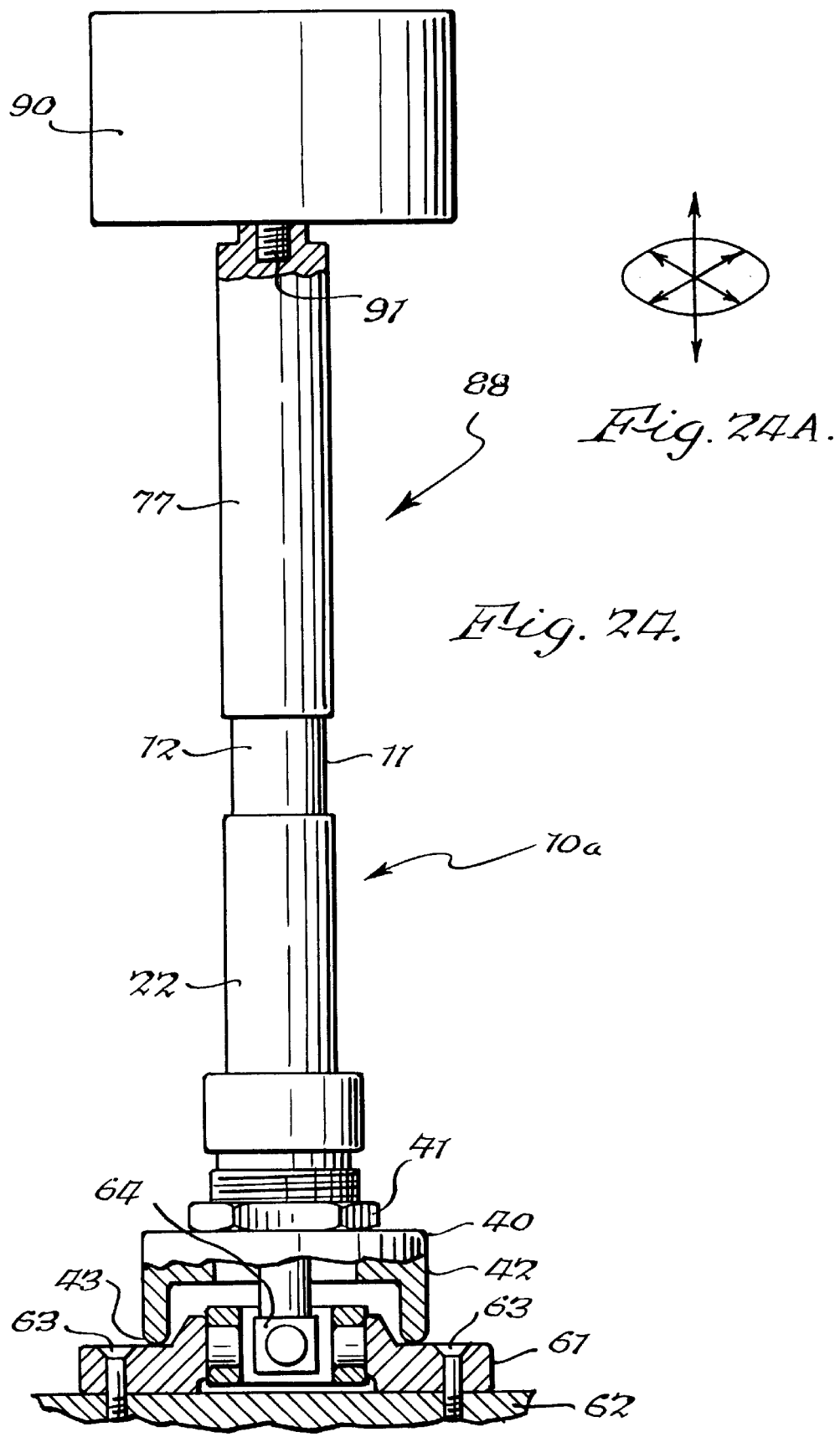

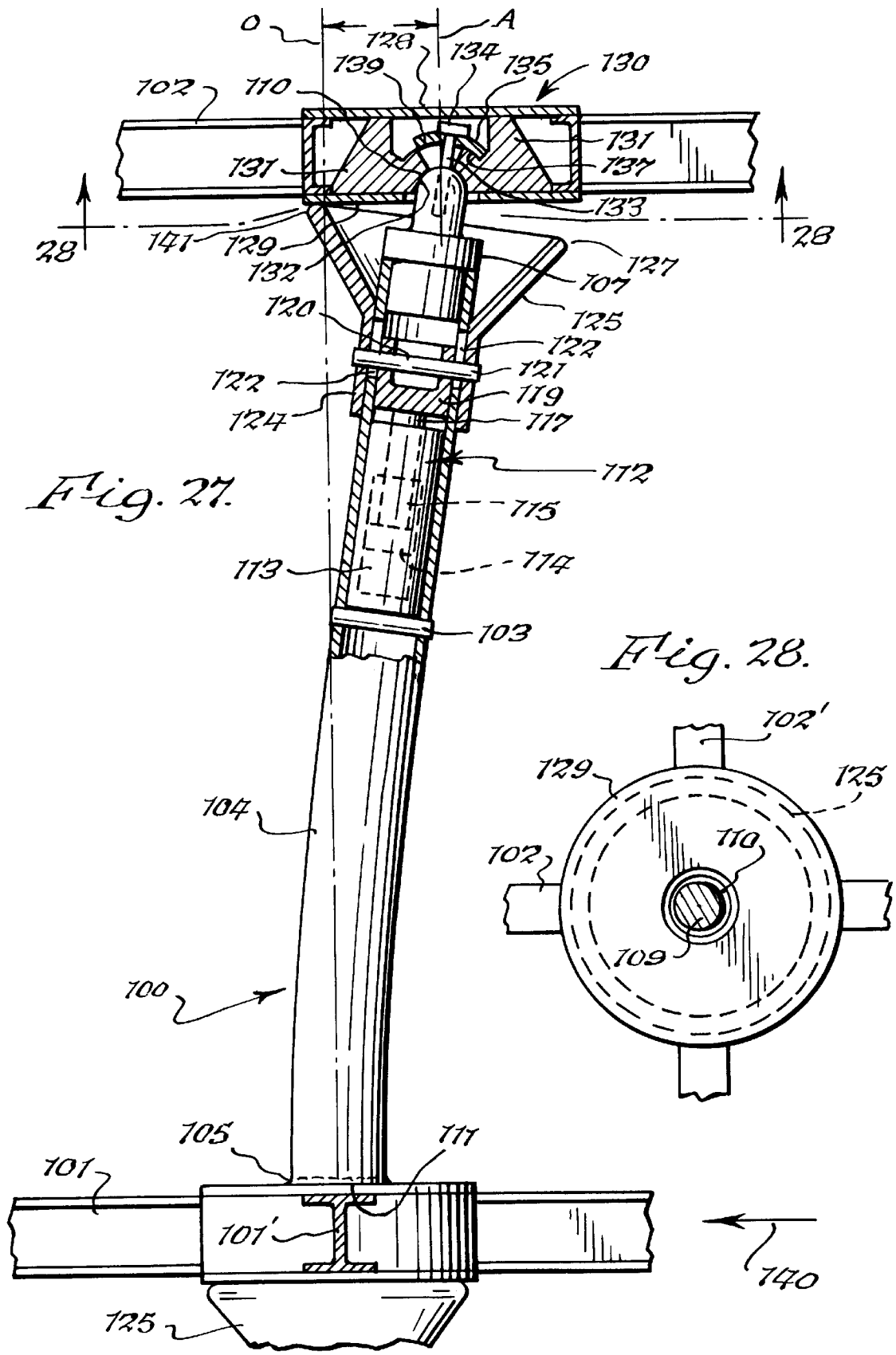

6,042,094

SELF-CENTERING COLUMN ASSEMBLY EMPLOYING LIQUID SPRING AND STRUCTURES CONTAINING SUCH COLUMNS

CROSS-REFERENCE TO RELATED APPLICATIONS

The present invention is a continuation-in-part of application Ser. No. 08/531,036, filed Sep. 20, 1995, now U.S. Pat. No. 4,890,705.

STATEMENT REGARDING FEDERALLY SPONSORED RESEARCH OR DEVELOPMENT

Not Applicable

BACKGROUND OF THE INVENTION

The present invention relates to a self-centering column assembly of a type which can be incorporated into a building structure for providing protection against damage from seismic events.

By way of background, during a seismic event, such as an earthquake, the ends of columns in buildings and bridges move laterally relative to each other with the beams to which they are connected. In the past, seismic protection for the purpose of damping and resisting such movement was effected by the use of diagonal braces, chevron braces and toggle linkages, each of which incorporated liquid damping devices. The foregoing prior types of seismic protective structures could not replace the columns of the structure, but were used in addition thereto. Also, when the prior types of seismic protection structures were located within the framework of the building, they interfered with the placement of windows in this portion of the building.

BRIEF SUMMARY OF THE INVENTION

It is accordingly one object of the present invention to provide an improved self-centering column assembly utilizing a liquid spring structure which can actually function as a column in a structure and thus be a substitute for a conventional column and which will dampen the movement of the structure and which will return to an upright position after it has been displaced by a seismic event.

Another object of the present invention is to provide an improved self-centering column assembly utilizing a liquid spring which will permit pivotal action of a supported body in all directions about the longitudinal axis of the self-centering column and which will dampen the movement of the structure into which it is incorporated and which will return to an upright position after it has been displaced by a seismic event.

A still further object of the present invention is to provide structures utilizing a plurality of self-centering column assemblies of the present invention.

Yet another object of the present invention is to provide a building structure wherein one or more self-centering column assemblies are positioned within a framework of a structure, preferably adjacent an existing column to provide damping to the structure and to provide a self-centering action for returning the column to its original upright position. Other objects and attendant advantages of the present invention will readily be perceived hereafter.

The present invention relates to a building structure having first and second vertically spaced frame members, a column, a first end on said column movably secured to said first frame member, a second end on said column secured to said second frame member, a movable member mounted on said column proximate said first end thereof, a first end on said movable member in effective movable engagement with said first frame member, a second end on said movable member movably mounted on said column, and a liquid spring coupled between said second end of said movable member and said column.

The present invention also relates to a building structure comprising a plurality of first frame members, a plurality of second frame members vertically spaced from said plurality of first frame members, and a plurality of columns secured between said first and second frame members, each of said columns having a first end movably secured to a first frame member and a second end secured to a second frame member, a movable member mounted on each of said columns proximate said first ends thereof, a first end on each of said movable members in effective engagement with each of said first frame members, a second end on each of said movable members movably mounted on each of said columns, and a liquid spring coupled between each of said second ends of said movable members and each of said columns.

The present invention also relates to a self-centering column for a building structure having first and second vertically spaced frame members supported by first and second horizontally spaced columns, said self-centering column being spaced adjacent to at least said first column and comprising a first end on said self-centering column movably secured to said first frame member, a second end on said self-centering column secured to said second frame member, said self-centering column including a movable member mounted on said self-centering column proximate said first end thereof, a first end on said movable member in effective engagement with said first frame member, a second end on said movable member movably mounted on said self-centering column, and a liquid spring coupled between said second end of said movable member and said self-centering column.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 1 is a side elevational view, partially in cross section, of the self-centering spring of the present invention in a centered position and mounted as a column between a base and a member which it supports;

FIG. 2 is a view similar to FIG. 1 but showing the spring of FIG. 1 tilted from its centered position in response to an external force;

FIG. 3 is a cross sectional view taken substantially along line 3—3 of FIG. 2;

FIG. 4 is a fragmentary cross sectional view taken substantially along line 4—4 of FIG. 2;

FIG. 5 is an enlarged cross sectional view taken substantially along line 5—5 of FIG. 1 and showing the internal structure of the self-centering spring;

FIG. 6 is a cross sectional view similar to FIG. 5 but showing the spring in the tilted position of FIG. 2;

FIG. 6A is a fragmentary cross sectional view taken substantially along line 6A—6A of FIG. 6 and showing the slot in the liquid spring housing through which a pin secured to the outer housing passes;

FIG. 7 is a perspective view showing a plurality of self-centering springs of FIGS. 1–6 which function as columns and are mounted between a base and a platform for the purpose of returning the platform to a position parallel to the base when forces applied to the platform are removed;

FIG. 7A is a schematic diagram showing the scope of movement of the platform of FIG. 7;

FIG. 8 is a plan view taken substantially in the direction of arrows 8—8 of FIG. 7 and showing the platform and the orientation of the self-centering springs relative thereto;

FIG. 9 is a perspective view of a modified form of the arrangement of FIG. 7 wherein a rigid link functions as a column and replaces one of the self-centering springs of FIG. 7;

FIG. 9A is a diagram of the scope of movement of the platform of FIG. 9;

FIG. 10 is a plan view taken substantially in the direction of arrows 10—10 of FIG. 9 and showing the orientations of the self-centering springs and the rigid link;

FIG. 11 is a perspective view of another orientation between a base and a supported member wherein the latter is supported by a single self-centering spring and the supported member is rigidly fixed to the upper end of the spring;

FIG. 12 is a plan view taken substantially along line 12—12 of FIG. 11;

FIG. 13 is a view, partially in cross section, taken substantially along line 13—13 of FIG. 11 and showing an universal joint at the base of the self-centering spring instead of the ball joint of FIGS. 1–6 so that the spring can only pivot about two axes without any rotational movement;

FIG. 13A is a diagram of the scope of movement of the spring of FIG. 13;

FIG. 14 is a cross sectional view taken substantially along line 14—14 of FIG. 13 and showing the universal joint and its relationship to the base;

FIG. 15 is a side elevational view, partially in cross section, taken substantially along line 15—15 of FIG. 16 and showing another embodiment of the present invention wherein universal joints are located at the base of the self-centering spring and also between the self-centering spring and the platform which it supports;

FIG. 16 is a perspective view showing the self-centering spring of FIG. 15 mounted between a base and a platform along with two rigid links which are pivotally connected between the base and platform;

FIG. 17 is a plan view taken substantially in the direction of arrows 17—17 of FIG. 16 and showing the orientation in plan between a self-centering spring and the rigid links;

FIG. 17A is a diagram showing the scope of movement of the platform of FIG. 17;

FIG. 18 is a cross sectional view taken substantially along line 18—18 of FIG. 15;

FIG. 19 is a fragmentary side elevational view, partially in cross section, of a self-centering spring which incorporates the features of FIG. 1 and also incorporates a tension-compression spring so that the supported platform is also resiliently supported in an axial direction;

FIG. 19A is a diagram showing the scope of movement of the self-centering spring of FIG. 19;

FIG. 20 is an expanded view partially in cross section taken substantially along line 20—20 of FIG. 19 and showing the construction of the tension-compression liquid spring portion of the self-centering spring of FIG. 19 which provides movement in an axial direction;

FIG. 21 is a cross sectional view of yet another embodiment of the present invention wherein a self-centering spring has an elastically deformable mounting therein to permit movement of the supported member in an axial direction;

FIG. 21A is a perspective diagram showing the scope of movement of the self-centering spring of FIG. 21;

FIG. 22 is a cross sectional view taken substantially along line 22—22 of FIG. 21 and showing the splined connection between the self-centering spring and the housing portion which supports a platform;

FIG. 23 is a cross sectional view taken substantially along line 23—23 of FIG. 21 and showing the rubber sleeve between the spring housing and the housing which supports the platform;

FIG. 24 is a side elevational view similar to FIG. 19 but showing an universal joint at the base rather than the ball joint of FIG. 19;

FIG. 24A is a perspective diagrammatic view of the scope of movement of the self-centering spring of FIG. 24;

FIG. 27 is a view similar to FIG. 26 and showing the vertically spaced structural beams of the structure displaced laterally relative to each other and showing the manner in which the self-centering column dampens the motion and functions to return to an upright position for returning the beams to their original positions;

FIG. 28 is a fragmentary cross sectional view taken substantially along line 28—28 of FIG. 27;

DETAILED DESCRIPTION OF THE INVENTION

Figure 25:
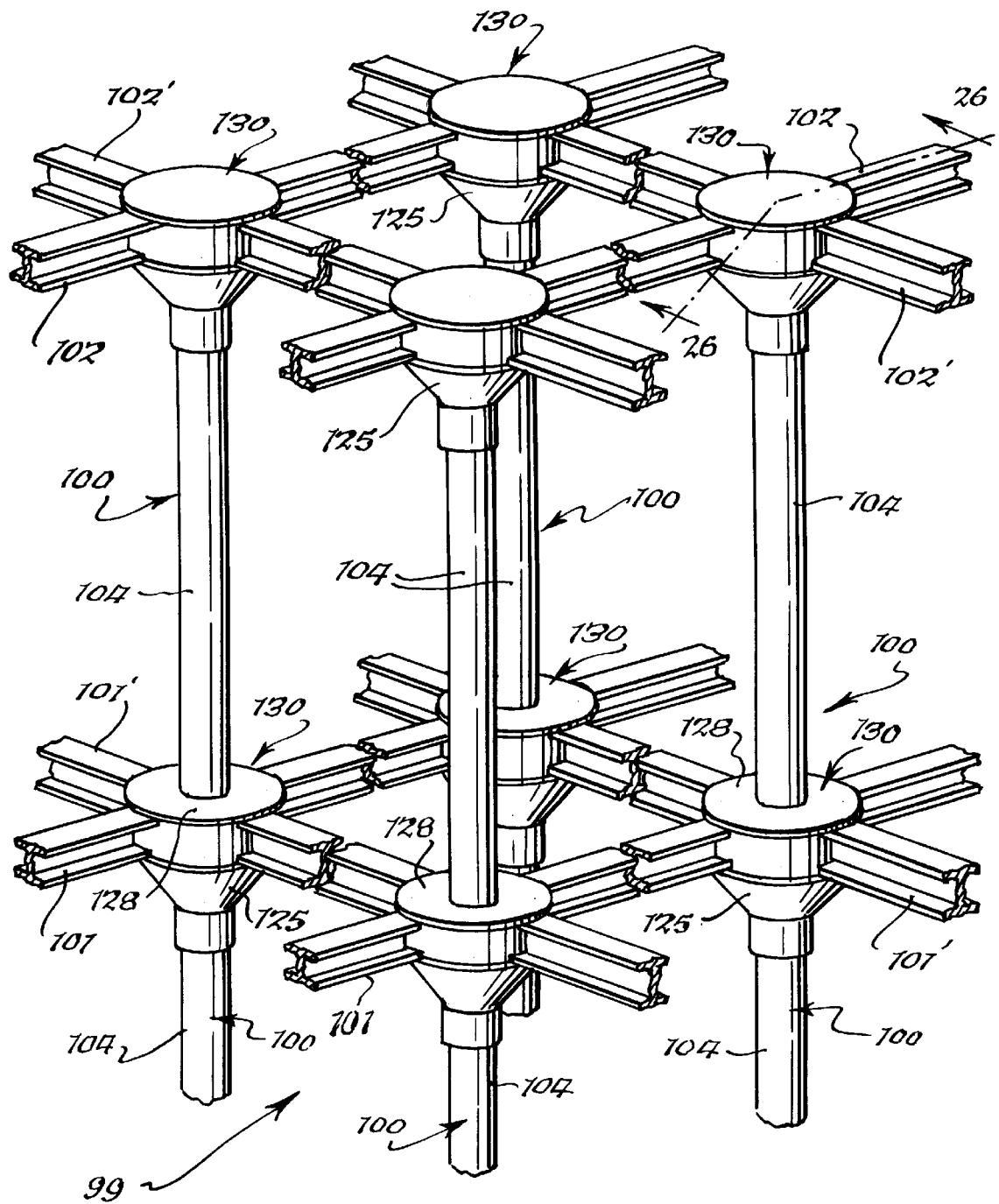
FIG. 25 s a fragmentary perspective schematic view of a building framework in which a plurality of self-centering column assemblies are incorporated with the building frame members as columns.

One embodiment of a self-centering spring assembly, which can function as a column, is shown in FIGS. 1–6. The self-centering spring assembly 10 includes a liquid spring 11 having a cylinder 12 which contains a compressible liquid 13. A piston 14 has a first portion 15 located within the cylinder 12 and a second portion 17 located outside of the cylinder and a central portion 20 which passes through a suitable seal 21. A damping head 16 is mounted on the portion of piston 14 which is located within cylinder 12. The specific construction of liquid spring 11 is conventional, and it is only important relative to the present invention in that it forms a part of the combination of the self-centering spring assembly 10. A liquid spring of this type is fully described in U.S. Pat. No. 3,933,344, which is incorporated herein by reference.

A casing or sleeve 22 is slidably mounted on cylinder 12. In this respect, the outer portion 17 of piston 14 is suitably secured to cylindrical member 23, as by a screw 26, and member 23 is slidable within cylinder extension 24. A pin 25 extends through a bore 27 in block 23 and is rigidly held therein by screw 26 which passes therethrough. The ends of pin 25 extend through slots 29 in cylinder extension 24.

A ball joint is associated with cylinder extension 24. In this respect, a stem 30, having a ball 31 at one end, has its opposite end 32 threadably mounted in block 33 which is secured in cylinder extension 24 by threaded portion 34 which forms an end of block 33. Ball 31 is retained relative to base 35 by disc-shaped bracket or base member 37 which is secured to base 35 by a plurality of screws 39. A casing member in the form of a skirt 40 is threadably affixed to casing 22 at threaded connection 41. Skirt 40 has a depending annular portion 42 which has an annular bearing surface 43 which, when the self-centering spring assembly is in the centered position of FIG. 1, bears on the entirety of bearing surface 44 of bracket 37. Ball 31 is held within bracket 37 because of its contact with the partial spherical surfaces 45 and 46 of bracket 37 and base 35, respectively, which are in complementary mating engagement with ball 31 and which permit ball 31 to pivot in all directions relative to bracket 37 and base 35. A second ball 47 has a stem 49 which is threadably mounted in cup-shaped member 50 which in turn is threadably mounted onto the end 51 of cylinder 12. Ball 47 is retained between bracket 52 which is secured to a body or platform 53 by a plurality of screws 54 which are analogous to screws 39. Member 52 is disc-shaped like member 37. A nut 55 threadably secures ball 47 to bracket 52. Bracket 52 and nut 55 have partial spherical surfaces which are in complementary mating relationship to ball 47 so that their combination comprises a ball joint.

As can be seen from FIGS. 1–6, the distance between balls 31 and 47 remains constant at all times inasmuch as they are fixedly mounted relative to the cylinder 12 and cylinder extension 24, respectively. When the liquid spring assembly is in the centered position of FIGS. 1 and 5, the compressible liquid 13 in cylinder 12 is under compression by virtue of the fact that the piston 14 is maintained within a liquid compressing position by block 23 connected to casing 22 by pin 25. In other words, when the piston 14 is assembled with casing 22 by block 23, it is forced into cylinder 12 so that there is a compressive force in the liquid 13 which tends to bias piston 14 out of cylinder 12.

When the self-centering spring assembly 10 is in the centered position, the annular bearing surface 43 is in full contact with surface 44 of bracket or base member 37, and it is maintained in this position by virtue of the force of the compressed liquid 13 biasing piston 14 out of cylinder 12. When the self-centering spring assembly is moved out of positions 1 and 5 in any direction whatsoever, the skirt 40 will be moved to the positions such as shown in FIGS. 2 and 6 wherein only a portion of annular bearing surface 43 bears against the associated surface 44 of bracket 37. When this occurs, piston 14 will be forced from its position of FIG. 5 into cylinder 12, as shown in FIG. 6, thereby creating a greater compression within liquid 13 which in turn biases piston 14 outwardly of cylinder 12 with a greater force thereby tending to return the skirt 40 to the positions shown in FIGS. 1 and 5. The reason that the foregoing action occurs is because the distance between balls 31 and 47 is constant and the tilting action of the spring assembly from its centered position causes casing 22 to move toward ball 47 and, in doing so, it forces piston 14 into cylinder 12. When the external force tending to move the spring assembly 10 from a centered position is removed, the spring force exerted by liquid 13 on piston 14 will return the spring assembly to the centered position wherein annular bearing surface 43 will be in full contact with bracket surface 44.

A number of arrangements are shown in FIGS. 7–10 of how the spring assembly 10 of FIGS. 1–6 can be mounted between a base and a platform or body, and they can be considered to be columns. More specifically, a base 35a is shown in FIGS. 7 and 8 supporting a body or platform 53a. There are three self-centering spring assemblies 10 positioned on a circle at 120° intervals. As can be visualized from FIG. 7A, platform 53a can move laterally in any direction, while remaining parallel to base member 35a. In other words, when an external force is applied thereto, platform 53a can experience rotational movement relative to base 35a or translational movement relative to base 35a or a combination of both. Under all conditions platform 53a will remain parallel to base 35a. When an external biasing force is removed from platform 53a which has moved the self-centering spring assemblies 10 from their centered positions, they will return to their centered positions, thereby bringing the platform 53a back to a centered position. It is to be noted that when the self-centering spring assemblies 10 move from the centered positions of FIG. 5 to the position of FIG. 6 a distance X, the platform 53 will move toward base 35 a distance Y, notwithstanding that the distance between balls 31 and 47 does not change.

In FIGS. 9 and 10 another arrangement utilizing a plurality of self-centering spring assemblies 10 is shown. In this embodiment the spring assemblies also function as columns. Platform 53b is supported on base 35b by two self-centering spring assemblies 10 and a rigid link 57 which has its opposite ends 59 and 60 pivotally connected by suitable pivotal connections to base 35b and platform 53b, respectively. Pivotal connections 59 and 60 have limited rotation in the direction that permits lateral motion. Accordingly, the same action will be obtained with the embodiment of FIGS. 9 and 10 as was described above relative to FIGS. 7 and 7A inasmuch as spring assemblies 10 will tend to return to a centered position after a biasing force is removed from platform 53b. As noted above, the length between balls 47 and 31 of the spring assemblies 10 remains constant during all pivotal movement of the spring assemblies 10. Likewise, the length between pivots 59 and 60 of rigid link 57 remains constant. Thus, the assemblage of FIGS. 9 and 10 operates in the same manner as the assemblage of FIGS. 7 and 8 without the necessity of utilizing a third self-centering spring assembly 10.

It will be appreciated also that under certain circumstances a single self-centering spring assembly 10 can be placed between a base, such as 35b, and a platform, such as 53b, when it is used with two rigid links, such as 57. In other words, an assembly can be made which is similar to FIGS. 9 and 10 but which uses two rigid links, such as 57, instead of the two spring assemblies 10 and it uses only one spring assembly 10 instead of the rigid link 57.

In FIGS. 11–14 another embodiment of the present invention is disclosed wherein a self-centering spring functions as a column. The self-centering spring assembly 10a includes a liquid spring 11 having a cylinder 12 and a casing 22, all of which are identical to that described above relative to FIGS. 1–6, and like numerals designate identical elements of structure, thereby obviating the necessity to describe such structure in specific detail. The embodiment of FIGS. 11–14 differs only from that of FIGS. 1–6 in that there are no ball joints at opposite ends of cylinder 11 and its cylinder extension 24 (not shown). Instead, a bracket 61 is provided which is secured to a base member 62 by a plurality of screws 63. There is a universal joint connection 64 between bracket 61 and stem 30a which is analogous to stem 30 of FIGS. 1–6. A platform or body 65 is fixedly secured to the upper end of cylinder 12 as by a threaded connection 67. Therefore, platform 65 cannot pivot relative to the upper end of cylinder 12. The scope of action of self-centering unit 10a is shown in FIG. 13a which indicates that the assembly 10a can pivot in all directions but it cannot rotate about its longitudinal axis, as does the embodiment of FIGS. 1–6. Furthermore, the body or platform 65 will tilt as the self-centering spring assembly pivots, whereas in FIGS. 1–6 the platform or body remains parallel to the base. However, if the casing 22 is part of a column which is sufficiently long, it may flex in the manner shown in FIG. 27.

In FIGS. 15–18 another embodiment of the present invention is disclosed wherein a self-centering spring assembly 10b is shown which includes a liquid spring 11 having a cylinder 12 and a casing 22 as described above relative to FIGS. 1–6. Identical numerals of FIGS. 1–6 and 11–13 and 15–18 will denote identical elements of structure, thereby obviating the necessity to describe such structure again in detail. The lower end of the self-centering spring assembly 10b is identical to that described above relative to FIGS. 11–13 and therefore the corresponding parts will be designated by identical numerals, thereby again obviating the necessity to describe such structure in detail. The embodiment of FIGS. 15–18 differs from the embodiment of FIGS. 11–14 only in that the upper end 67 of cylinder 12 carries a second universal joint 69 which is mounted in bracket 70 which is secured to body or platform 71 by a plurality of screws 72. Thus, this embodiment will have universal pivotal motion at its lower end by virtue of universal 64 and it will have universal pivotal motion at its upper end by virtue of universal 69. Therefore, as shown in FIG. 17A, the platform 71 can pivot in all directions relative to cylinder 12 and cylinder 12 can pivot in all directions relative to base 62 as the self-centering unit 10b is moved from its centered position of FIG. 15 when a biasing force is applied to platform or body 71. However, self-centering spring assembly 10b cannot pivot about its longitudinal axis. If casing 22 is sufficiently long, this embodiment can function as a column between vertically spaced structural members.

In FIGS. 16 and 17 an arrangement is shown wherein a body or platform 71 is supported on a base 62 by a self-centering spring assembly 10b and a pair of rigid links 73 each having a full pivotal connection 74 at its lower end and a full pivotal connection 75 at its upper end. This arrangement will permit platform 71 to move laterally in all directions relative to base 62 but platform 71 cannot pivot about the axis of spring assembly 10b. In other words, the universals 64 and 69 prevent platform 71 from pivoting about an axis which is coincident with the longitudinal axis of spring assembly 10b.

In FIGS. 19–20 yet another embodiment of the present invention is disclosed wherein a self-centering spring unit 10c is shown which includes a liquid spring 77 which is operable in both tension and compression. A spring of this type is fully disclosed and described in U.S. Pat. No. 4,611,794 which is incorporated herein by reference, thereby obviating the necessity to describe this type of liquid spring in detail. The advantage of a liquid spring of this type is that the balls 47 and 31 can move toward and away from each other. In this embodiment, elements of structure which are identical to those of FIGS. 1–6 are denoted by identical numerals, thereby obviating the necessity to describe such structure relative to these figures. In this embodiment the cylinder 12 and cylinder extension (not shown) are identical to that shown in FIGS. 1–6. The only difference between FIGS. 1–6 and FIGS. 19–20 is that a liquid spring 77 which is operable in tension and compression has been mounted on the end of cylinder 12 by means of a threaded connection 78. This embodiment can be used as a column by itself or in conjunction with conventional structural columns.

In the embodiment of FIGS. 19–20, the platform or body 53 can pivot in all directions relative to base 35, and/or it can move directly toward and away from base 35 in the direction of the longitudinal axis of the liquid spring unit 77, and it will return to its longitudinal original position after the external forces are removed. The self-centering liquid spring assembly of FIGS. 19–20 can thus be placed in association with a platform and base in the same orientations as set forth above relative to FIGS. 7–8 and FIGS. 9–10.

In FIGS. 21–23 a still further embodiment of the present invention is disclosed which not only possesses self-centering action but in addition permits movement between a platform or body 80 and a base 81 in a direction longitudinally of the axis of the self-centering spring assembly 10d. The spring assembly 10d includes parts of the embodiment of FIGS. 1–6 and parts of the embodiment of FIGS. 11–14, and like numerals of those figures will be used to designate like structure in the embodiment 10d to obviate the necessity of further detailed explanation. A liquid spring 11 is shown having a cylinder 12 and a piston 14, the outer end of which is secured to block 23 held by casing 22 by means of pin 25. A second casing 82 has its lower end threadably secured onto annular member 83 which is slidable on casing 22. A sleeve 84 has its end 85 threadably mounted on the upper end of cylinder 12. An annular elastomeric sleeve 87 is bonded between sleeve 84 and sleeve 82. Thus, there can be relative axial movement between sleeves 82 and 84 because of the elastomeric quality of sleeve 87 which is bonded therebetween. Thus, since sleeve 84 is fixed to cylinder 12 and sleeve 82 is movable relative to casing 22, sleeve 82 can move axially relative to cylinder 12, as limited by the resilience of elastomeric sleeve 87. Thus, when axial forces in the direction of arrows 89 are applied to platform 80, elastomeric sleeve 87 will elastically deform to permit the above-described longitudinal relative axial movement, and when the forces along axis 89 are removed, elastomeric sleeve 87 will return to its original position. It will also be noted that the universal joint 64 limits the rotational movement of cylinder 12 about its longitudinal axis but it permits the self-centering action to be effected in all directions. There is a splined connection at 89 between outer casing 82 and sleeve 85 which prevents relative rotational movement between sleeve 82 and sleeve 84. The embodiment of FIGS. 21–23 can function as a structural column in various suitable applications.

In FIG. 24 a still further embodiment of the present invention is disclosed which includes structure shown in FIGS. 1–6 and FIGS. 11–14, and such structure will be designated by like numerals. In addition to the foregoing, the embodiment of FIG. 24 includes a liquid spring tension compression unit 77 which is shown and fully described in U.S. Pat. No. 4,611,794 which is incorporated herein by reference. The liquid spring unit 77 will permit the body or platform 90 to move toward and away from base 62 along the axis of the liquid spring unit 77 which can pivot in all directions because of the action of universal 64, but the self-centering spring assembly 10a cannot pivot about its longitudinal axis, as described above relative to FIGS. 11–14. This embodiment functions as a column.

A plurality of liquid spring assemblies such as shown in FIGS. 21–23 can be mounted between a base and platform, as described above relative to FIGS. 7 and 8, and thus they will function as columns.

In FIG. 25 a fragmentary perspective view of a building framework 99 is shown into which a plurality of self-centering column assemblies 100 are incorporated. More specifically, one story of the framework 99 includes a plurality of vertically spaced horizontal beams or frame members 101 and 102 which are substantially parallel to each other and a plurality of beams or frame members 101' and 102' which extend transversely to and effectively intersect beams 101 and 102, respectively. Other stories may have constructions similar to the story between beams 101, 101', 102 and 102', one such other story being fragmentarily shown below beams 101 and 101'.

Each column 100 includes a continuous casing 104 in the form of a hollow cylindrical member having its lower end effectively welded to beams 101 and 101' by being welded to plate 128 of box unit 130 at 105. It will be appreciated that if there are no box units 130 at the lower ends of casings 104, the casings 104 can be welded or otherwise permanently affixed directly to the beams 101 or 101'. The upper end of each casing 104 has a cap 107 welded thereto from which a member 109 extends and which terminates at a spherical end portion 110. Thus, the distance between surface 110 and the lower end 111 of casing 104 is fixed. While casing 104 is shown as a hollow cylindrical member, it will be appreciated that the portion below the liquid spring 112, which is described in greater detail hereafter, may be a solid of any suitable configuration, such as an I-beam which is conventionally used between beams.

Figure 26:
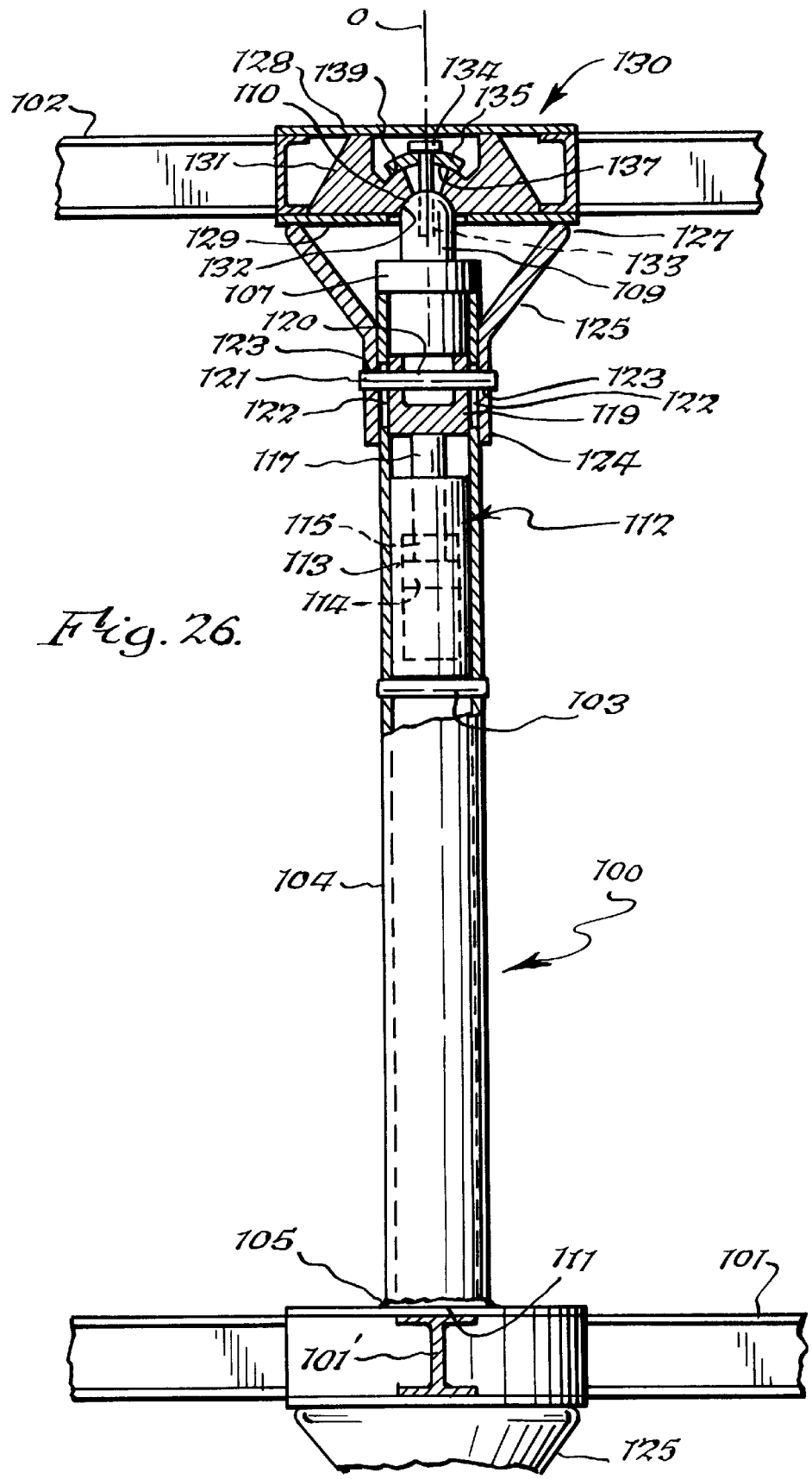
FIG. 26 is an enlarged fragmentary view, partially in cross section taken substantially along line 26—26 of FIG. 25 and showing details of the self-centering columns of FIG. 25.

A spring assembly and related structure is incorporated into casing 104 to provide the above-described self-centering action in the event that beam 102 should move from position O to position A of FIG. 27 when moving from its normal position of FIG. 26 during a seismic occurrence. More specifically, the self-centering structure includes a liquid spring 112 having a cylinder 113 and a piston 114 having a portion 115 within cylinder 113 and a portion 117 outside of cylinder 113 to which a cylindrical member 119 is attached as by welding. A pin 103 maintains the cylinder 113 in position. Cylindrical member 119 has a pin 120 extending therethrough which has outer ends 121 extending through diametrically opposite slots 122 in casing 104. The ends 121 of pin 120 are received in bores 123 of cylindrical member 124 which is formed integrally with frustoconical member 125 and is slidable on casing 104. The outer circular end or rim 127 of frustoconical member 125 bears on plate 129 which is the lower portion of box unit 130 which is fixedly mounted between beams 102 and 102'. The fact that circular end 127 is a complete 360° permits the liquid spring 112 to function in response to column deflection in any angular deflection relative to plate 129. The liquid spring 112 is preferably of the type shown in U.S. Pat. No. 5,462,141 which provides both a liquid spring action plus damping, and this patent is incorporated herein in its entirety. In addition, other types of springs which include damping may be used. For example, a spring which includes a mechanical spring plus a hydraulic damping unit such as shown in U.S. Pat. No. 4,150,819 may be used, and this patent is incorporated herein in its entirety. Other types of liquid spring dampers which can be used are shown in U.S. Pat. Nos. 4,064,977, 4,582,303 and 4,591,033. It will be appreciated that other types of springs including various mechanical types may be used to bring the columns 100 back to upright centered positions.

Incorporated into box unit 130 is a frustoconical fitting 131 having a spherical depression 132 which is in complementary mating engagement with the spherical end 110 of member 109 to thus form a spherical joint which constitutes a pivotable connection between spherical end 110 and surface 132. It will be appreciated that any other type of pivotable connection which produces the desired function may be used. A pin 133 has its lower portion fixedly secured within member 109 and it has a broadened head 134 which bears on plate-like member 135 which has a spherical inner surface 137 which bears on spherical surface 139. The foregoing constitutes a fixed length connection between the spherical joint and beams 102 and 102'. By virtue of the fixed length connection between member 135 and member 131, beams 102 and 102' cannot move upwardly away from column 100.

When there is a seismic disturbance such that beam 101 moves in the direction of arrow 140 relative to beam 102 giving a displacement from position O to position A in FIG. 27, column 100 will bend. This will cause frustoconical member 125 to assume the position shown in FIG. 27 wherein end portion 141 of circular rim 127 bears on plate 129 and in so doing, considering that the distance between the end 110 of the column 100 and its base 111 remain constant, piston 114 will be driven into cylinder 113 from its position of FIG. 26 to its position of FIG. 27 because cylindrical portion 124 will be caused to slide downwardly on casing 104 and thus drive pin 120 downwardly in slots 122 which in turn drives member 119 downwardly and with it drives piston 114 into cylinder 113. This will activate the liquid spring to provide a biasing force on piston 114 tending to move it out of cylinder 113 which results in column 100 tending to right itself back to its upright position of FIG. 26, thereby providing a restoring force on the structure. In addition, the liquid spring 112 tends to absorb the force produced by beams 101 and 101' moving to the left relative to beams 102 and 102' to thereby lessen the amount of movement thereof. Thus, columns 100 serve the dual purpose of both resisting movement of beams 101 and 101' relative to beams 102 and 102' and, in addition, provide a restoring force for biasing the beams back toward their original positions.

Figure 29:
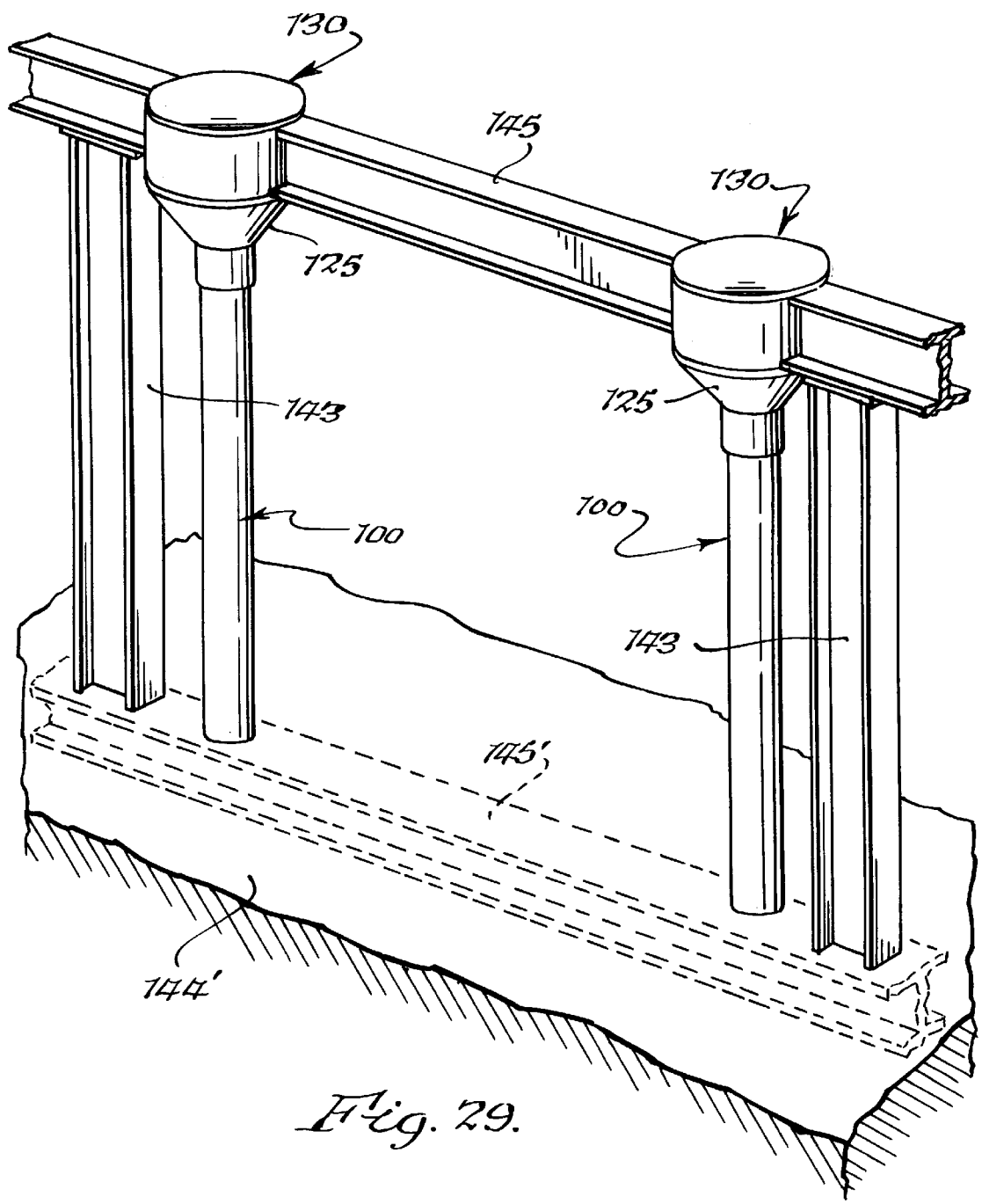
FIG. 29 is a fragmentary perspective view of another embodiment of the present invention wherein the self-centering columns are used in conjunction with and adjacent to conventional columns to provide a self-centering damping action to the adjacent columns while permitting the space between the columns to be mostly unobstructed.
Figure 30:
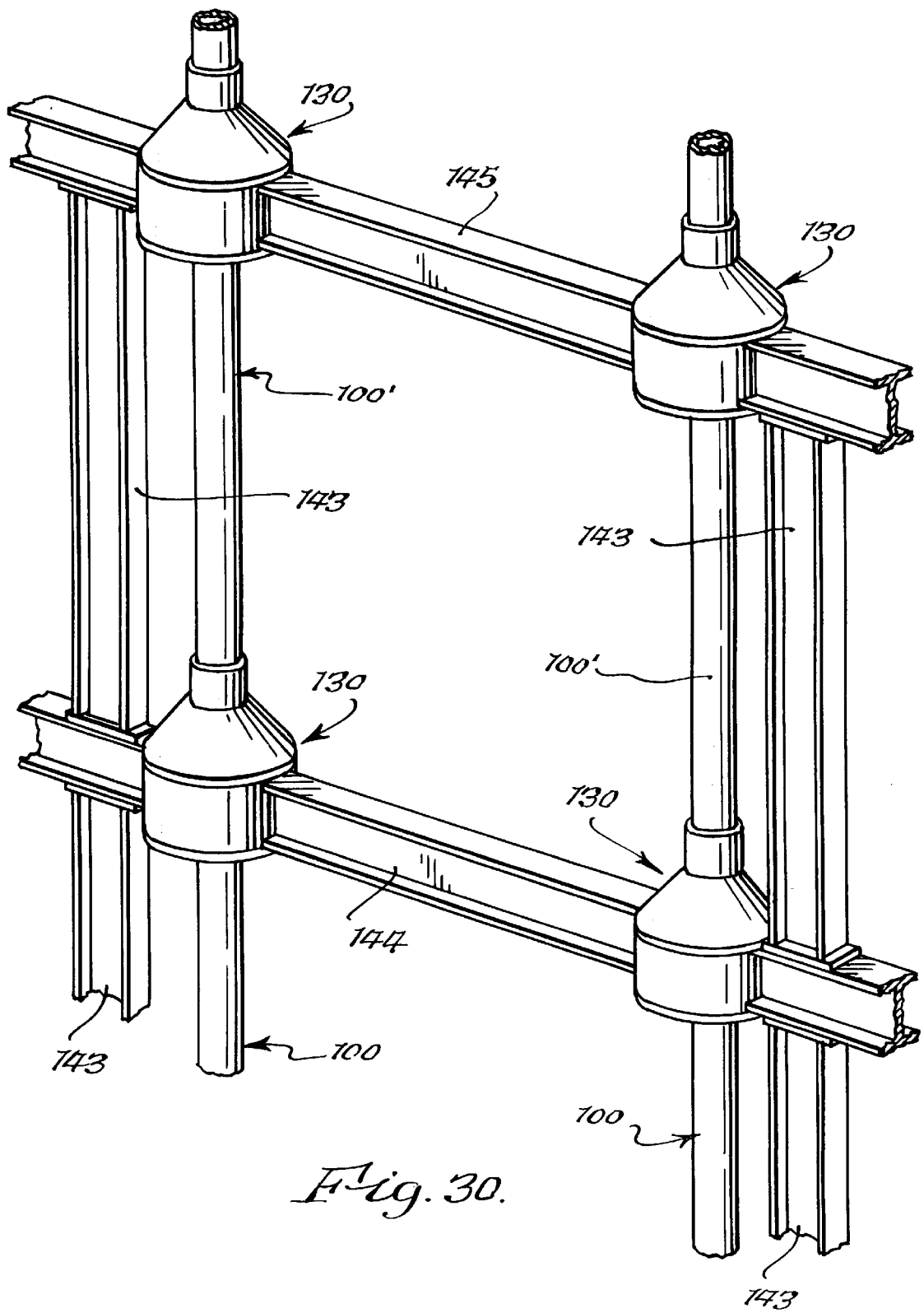
FIG. 30 is a fragmentary schematic view of a modified embodiment of the construction shown in FIG. 29.

As noted above relative to FIGS. 25–28, the self-centering columns 100 can be part of a framework of a building so that they provide the column supports themselves. However, as shown in FIG. 29, modified columns 100' may be used in another manner in cooperation with existing conventional structural columns such as 143 which extend between beams and a foundation or frame member 144' and beam or frame member 145. More specifically, modified columns 100' utilize devices which are primarily dampers rather than primarily liquid springs inasmuch as the basic spring force tending to return the columns 143 to an upright condition is in the columns of the buildings themselves. Devices of the types which can be incorporated into the columns 101' are shown in U.S. Pat. Nos. 3,722,640, 3,933,344, 4,389,045, 4,532,856 and 4,718,648 which are incorporated herein by reference in their entireties. When a liquid damper is used, it must have enough spring force to push the parts back to a damping mode after the damping has been effected. The purpose of the construction of FIGS. 29 and 30 is to provide a mostly unobstructed opening between columns 100 within the framework bounded between foundation 144', beam 145 and structural columns 143. This can be all the more appreciated when it is considered that prior types of shock absorbing structures, such as diagonal braces and toggle braces and chevron braces, would extend across most of the open space within the foregoing framework. While the lower-most portion of the framework is foundation 144', it will be appreciated that the lowermost portion may be another beam or frame member 145, which is shown in dotted lines in FIG. 29.

In FIG. 30 a schematic showing is made with the modified columns 100' placed in an inverted position within a framework 143, 144, 145.

In the foregoing description beams such as 101, 101', 102 and 102' and the foundation 144' have also been referred to as frame members, and this latter terminology has been carried over into the claims considering that the main relevance of the present invention is the self-centering column concept irrespective of the structure of the vertically spaced frame members between which the self-centering columns are placed.

It can thus be seen that the various embodiments of the self-centering spring assemblies of the present invention are manifestly capable of achieving the above-enumerated objects, and while preferred embodiments of the present invention have been disclosed, it will be appreciated that the present invention is not limited thereto but may be otherwise embodied within the scope of the following claims.

What is claimed is:

1. In a building structure having a plurality of stories with adjacent first and second stories having first and second vertically spaced frame members, respectively, which are subject to relative lateral displacement due to a seismic event, the improvement of a column, a first end on said column movably secured to a first frame member, a second end on said column secured to a second frame member, a movable member mounted on said column proximate said first end thereof, a first end on said movable member in effective movable engagement with said first frame member, a second end on said movable member movably mounted on said column, and a liquid spring coupled between said second end of said movable member and said column.

2. In a building structure as set forth in claim 1 wherein said first end of said column is secured to said first frame member by a pivotable connection.

3. In a building structure as set forth in claim 2 including a fixed length connection between said first end of said column and said first frame member at said pivotable connection.

4. In a building structure as set forth in claim 2 wherein said pivotable connection is a spherical joint.

5. In a building structure as set forth in claim 3 wherein said fixed length connection comprises a fitting secured to said first frame member, a first spherical surface on said fitting, a plate-like member having a second spherical surface in engagement with said first spherical surface, and a pin extending outwardly from said spherical joint, and connected between said plate-like member and said spherical joint.

6. In a building structure as set forth in claim 2 including a fixed length connection between said first end of said column and said first frame member at said pivotable connection.

7. In a building structure as set forth in claim 1 wherein said first end of said movable member is of circumferential extent, and a plate secured to said first frame member with which said first end of circumferential extent of said movable member is in engagement.

8. In a building structure as set forth in claim 1 wherein said movable member is frustoconical, and wherein said first end of said movable member is circular, and a plate on said first frame member with which said circular end is in engagement.

9. In a building structure as set forth in claim 8 wherein said second end of said movable member is slidably mounted on said column.

10. In a building structure as set forth in claim 9 wherein said liquid spring includes a piston, and wherein said second end of said movable member is connected to said piston.

11. A building structure having a plurality of adjacent stories comprising a plurality of first frame members in first of said stories, a plurality of second frame members in second of said stories which are adjacent to said first stories, said plurality of said second frame members being vertically spaced from said plurality of first frame members and being subject to relative lateral displacement due to a seismic event, and a plurality of columns secured between said first and second frame members, each of said columns having a first end movably secured to a first frame member and a second end secured to a second frame member, a movable member mounted on each of said columns proximate said first ends thereof, a first end on each of said movable members in effective engagement with each of said first frame members, a second end on each of said movable members movably mounted on each of said columns, and a liquid spring coupled between each of said second ends of said movable members and each of said columns.

12. A building structure as set forth in 11 wherein said first end of each of said columns is secured to each of said first frame members by a pivotable connection.

13. A building structure as set forth in claim 12 including a fixed length connection between said first end of each of said columns and each of said first frame members at said pivotable connections.

14. A building structure as set forth in claim 12 wherein said pivotable connection is a spherical joint.

15. In a building structure as set forth in claim 13 wherein said fixed length connection comprises a fitting secured to said first frame member, a first spherical surface on said fitting, a plate-like member having a second spherical surface in engagement with said first spherical surface, and a pin extending outwardly from said spherical joint, and connected between said plate-like member and said spherical joint.

16. In a building structure as set forth in claim 12 including a fixed length connection between said first end of each of said columns and each of said first frame members at said pivotable connections.

17. In a building structure as set forth in claim 11 wherein said first end of said movable member is of circumferential extent, and a plate secured to said first frame member with which said first end of circumferential extent of said movable member is in engagement.

18. In a building structure as set forth in claim 11 wherein said movable member is frustoconical, and wherein said first end of said movable member is circular, and a plate on said first frame member with which said circular end is in engagement.

19. In a building structure as set forth in claim 18 wherein said second end of said movable member is slidably mounted on said column.

20. In a building structure as set forth in claim 19 wherein said liquid spring includes a piston, and wherein said second end of said movable member is connected to said piston.

21. In a building structure having a plurality of stories with adjacent first and second stories having first and second vertically spaced frame members, respectively, which are subject to relative lateral displacement due to a seismic event, and with first horizontally spaced columns between said first and second frame members, the improvement of, a plurality of self-centering columns spaced relative to said first columns, each said self-centering column comprising a first end on said self-centering column movably secured to a first frame member, a second end on said self-centering column secured to a second frame member, each said self-centering column including a movable member mounted on said self-centering column proximate said first end thereof, a first end on said movable member in effective engagement with a first frame member, a second end on said movable member movably mounted on said self-centering column, and damping means coupled between said second end of said movable member and said self-centering column.

22. In a building structure as set forth in claim 21 wherein said first end of said self-centering column is secured to said first frame member by a pivotable connection.

23. In a building structure as set forth in claim 22 including a fixed length connection between said first end of said self-centering column and said first frame member at said pivotable connection.

24. In a building structure as set forth in claim 22 wherein said pivotable connection is a spherical joint.

25. In a building structure as set forth in claim 23 wherein said fixed length connection comprises a fitting secured to said first frame member, a first spherical surface on said fitting, a plate-like member having a second spherical surface in engagement with said first spherical surface, and a pin extending outwardly from said spherical joint, and connected between said plate-like member and said spherical joint.

26. In a building structure as set forth in claim 22 including a fixed length connection between said first end of said self-centering column and said first frame member at said pivotable connection.

27. In a building structure as set forth in claim 21 wherein said first end of said movable member is of circumferential extent, and a plate secured to said first frame member with which said first end of circumferential extent of said movable member is in engagement.

28. In a building structure as set forth in claim 21 wherein said movable member is frustoconical, and wherein said first end of said movable member is circular, and a plate on said first frame member with which said circular end is in engagement.

29. In a building structure as set forth in claim 28 wherein said second end of said movable member is slidably mounted on said self-centering column.

30. In a building structure as set forth in claim 29 wherein said liquid spring includes a piston, and wherein said second end of said movable member is connected to said piston.

31. In a building structure as set forth in claim 21 including a second self-centering column adjacent to said second column.

* * * * *